(12) United States Patent
Hess

(10) Patent No.: US 12,364,207 B1
(45) Date of Patent: Jul. 22, 2025

(54) SYSTEM FOR USING PULSED ELECTROMAGNETIC FREQUENCIES AND ELECTROHYDRODYNAMIC FLOWS FOR IMPROVED PLANT GROWTH

(71) Applicant: Don Hess, Tampa, FL (US)

(72) Inventor: Don Hess, Tampa, FL (US)

( * ) Notice: Subject to any disclaimer, the term of this patent is extended or adjusted under 35 U.S.C. 154(b) by 8 days.

(21) Appl. No.: 18/410,468

(22) Filed: Jan. 11, 2024

(51) Int. Cl.
*A01G 7/04* (2006.01)
*H01T 23/00* (2006.01)

(52) U.S. Cl.
CPC .............. *A01G 7/04* (2013.01); *H01T 23/00* (2013.01)

(58) Field of Classification Search
CPC ........... A01G 7/04; A01G 22/15; H01T 23/00
See application file for complete search history.

(56) References Cited

U.S. PATENT DOCUMENTS

| 6,023,880 | A  | * | 2/2000 | Levengood | A01H 3/00 47/1.3 |
| 2014/0259907 | A1 | * | 9/2014 | Gorton | H01T 23/00 47/58.1 SC |
| 2015/0070812 | A1 | * | 3/2015 | Lee | H01T 23/00 361/231 |
| 2024/0316572 | A1 | * | 9/2024 | Hamm | A01G 7/04 |

FOREIGN PATENT DOCUMENTS

JP      2013223457 A  * 10/2013

* cited by examiner

*Primary Examiner* — Christopher D Hutchens
(74) *Attorney, Agent, or Firm* — GrayRobinson, P.A.

(57) ABSTRACT

Disclosed is a system for improving plant growth through the use of electrohydrodynamic (EHD) flows and electromagnetic fields. It has been discovered that the combined use of EHD flows and electromagnetic fields yields surprising plant growth. It has also been discovered that further beneficial growth can be achieved via the use of specific electromagnetic frequencies and field strengths.

15 Claims, 6 Drawing Sheets

SYSTEM FOR USING PULSED ELECTROMAGNETIC FREQUENCIES AND ELECTROHYDRODYNAMIC FLOWS FOR IMPROVED PLANT GROWTH

TECHNICAL FIELD

This disclosure relates to systems for improved plant growth. In particular, the disclosure relates to improved plant growth via pulsed electromagnetic frequencies and electrohydrodynamic flow.

BACKGROUND OF THE INVENTION

The use of electromagnetic frequencies to improve plant growth is known in the art. For instance, U.S. Patent Publication No. 2022/0287245 to Cordova et al. discloses a system for the electromagnetic treatment of crops. The electromagnetic treatment can improve or modify plant growth, development, chemical profile, appearance, and tolerances. U.S. Pat. No. 5,077,934 to Liboff further discloses a method and apparatus for controlling plant growth via the use of a magnetic field generator. The field generator produces a controlled, fluctuating, and directionally oriented magnetic field that projects through viable plant material. Ion wind generators are also known in the art. For example, U.S. Pat. No. 3,818,269 to Stark discloses a means for producing ions for the treatment of atmospheric air and gaseous media environments. Stark discloses uses for its system such as eliminating static effects in the textile industry and improving plant growth in greenhouses.

However, the foregoing background art fails to address the synergistic effects of the combined use of electrohydrodynamic flow and pulsed electromagnetic frequencies upon plant growth. Nor does the background art address the use of specific targeted frequencies and field strengths for specific types of plant growth. The system disclosed herein is aimed at such specific and combined uses of electrohydrodynamic flow and pulsed electromagnetic frequencies.

SUMMARY OF THE INVENTION

This disclosure is directed to the use of electrohydrodynamic flow and pulsed electromagnetic frequencies for improved plant growth.

The disclosed system has several important advantages. For example, the present inventor has discovered that the combined use of ion flow and pulsed electromagnetic frequencies has advantageous effects on various types of plant growth.

A further possible advantage is achieved by exposing plants to an electromagnetic coil that generates an electromagnetic field at specific field strengths and frequencies.

More specifically, it has been found that electromagnetic fields having a frequency of between 6-76 Hertz and a field strength of between 0.1 to 2.3 milliteslas are uniquely beneficial for plant growth.

Still yet another possible advantage of the present system is to expose plants to specific electromagnetic fields while also exposing the plants to an electrohydrodynamically generated ion wind.

Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which.

Similar references numerals refer to similar features throughout the several views of the drawings.

DETAILED DESCRIPTION OF THE DRAWINGS

Disclosed is a system for improving plant growth using electrohydrodynamic (EHD) flow and pulsed electromagnetic fields. It has been discovered that the combined use of EHD flows and pulsed electromagnetic fields yields enhanced plant growth. This enhancement includes growing roots faster, giving plants stronger immune systems and higher levels of plant constituents. It has also been discovered that further beneficial growth can be achieved via the use of specific electromagnetic frequencies and field strengths. The various details of the present invention, and the manner in which they interrelate, are described in greater detail hereinafter.

Figure 1:
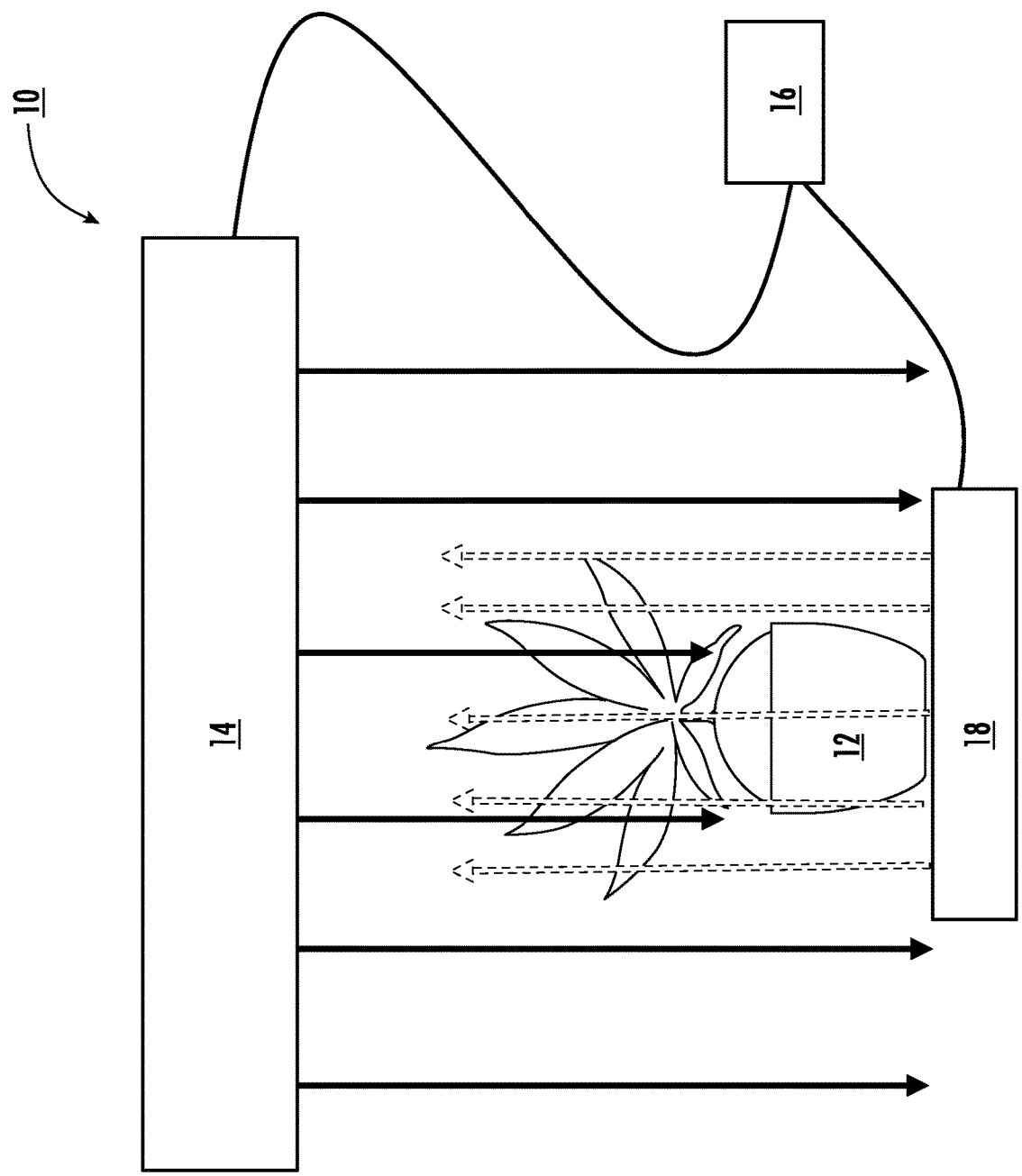
FIG. 1 is a diagram of an electrohydrodynamic (EHD) flow and pulsed electromagnetic frequencies (PEMFs) on an individual plant.

With reference to FIG. 1, a representative example of the system (10) for improved plant growth is disclosed. System (10) utilizes an EHD (or ion wind) generating device (14). EHD generator (14) is ideally positioned over top of one or more plants (12). EHD generator (14) is coupled to and is powered by power supply (16). Power supply (16) is also coupled to an electromagnetic coil (18). Ideally, the plant (12) sits on top of electromagnetic coil (18). This arrangement allows ions from the EDH generator (14) to be propelled downwardly upon plant (12) while at the same time the plant (12) is impacted by the electromagnetic fields generated by coil (18). The ion wind from EHD generator (14) when combined with the electromagnetic frequencies from coil (18) have proven to both increase the rate plant growth and yield beneficial plant characteristics. For instance, when used to improve the growth of *cannabis*, the disclosed system also increases the levels of tetrahydrocannabinol or THC, cannabinoids and other terpenes. It can be used to improve the growth of other plants such as Basil.

Figure 2:
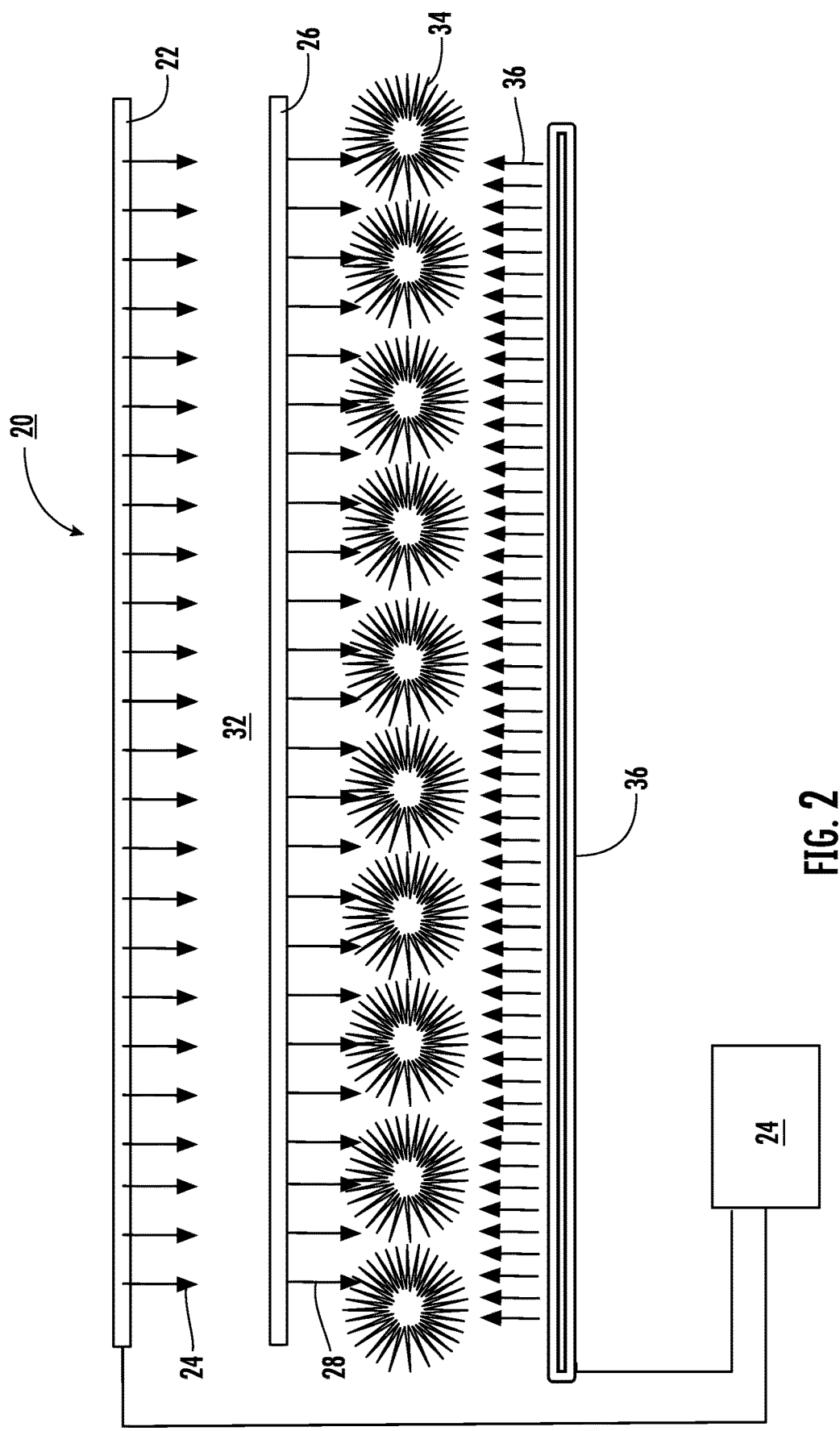
FIG. 2 is a diagram of an EHD flow and PEMFs on a group of plants.
Figure 3:
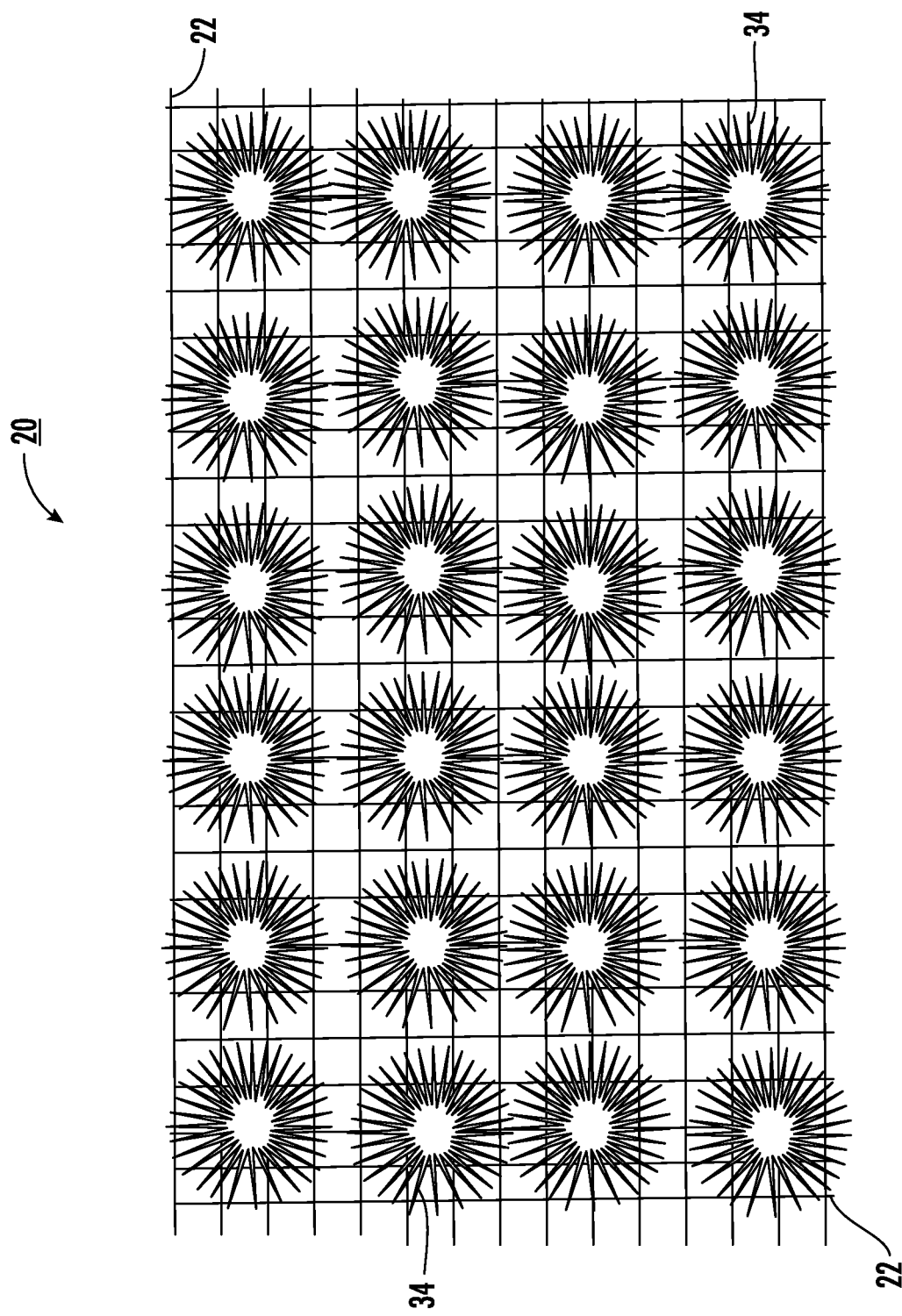
FIG. 3 is a top plan view of FIG. 2.

FIG. 2 illustrates a further system (20) that can be employed upon a number of individual plants (34). System (20) is illustrated for use on a number of *cannabis* plants (34); however, the present invention can be used on a range of different plant types. System (20) employs an anode (22) coupled to a power supply (24) to generate ions. More specifically, power supply (24) has a sufficiently high voltage such that the anode (22) ionizes the surrounding air to generate ions (24). A cathode (26) is positioned opposite the anode (22), with an air gap (32) formed between the anode (22) and cathode (26). Due to the opposing charge of the anode and cathode (22, 26), a portion of the ions (24) generated by anode (22) are accelerated toward the cathode (26) to create an ion wind (28).

A series of plants (34) are positioned beneath the anode cathode (22, 26). This allows the plants (34) to be bathed in the downwardly flowing ion wind. This ion wind combines with the electromagnetic frequencies generated by coil (36). In this regard, each plant (34) can sit over a separate coil (36), or alternatively, a longer coil can extend below one or more rows of plants (34). In a preferred embodiment, the electromagnetic coil (36) generates an electromagnetic field (38) having a frequency of between 1-76 Hertz and a field strength of between 0.1 to 2.3 milliteslas. In a further improved embodiment, a frequency of 40 Hertz is preferred. These preferred frequencies and field strengths are beneficial for *cannabis* plant growth and increased cannabinoid and terpene levels.

Figure 4:
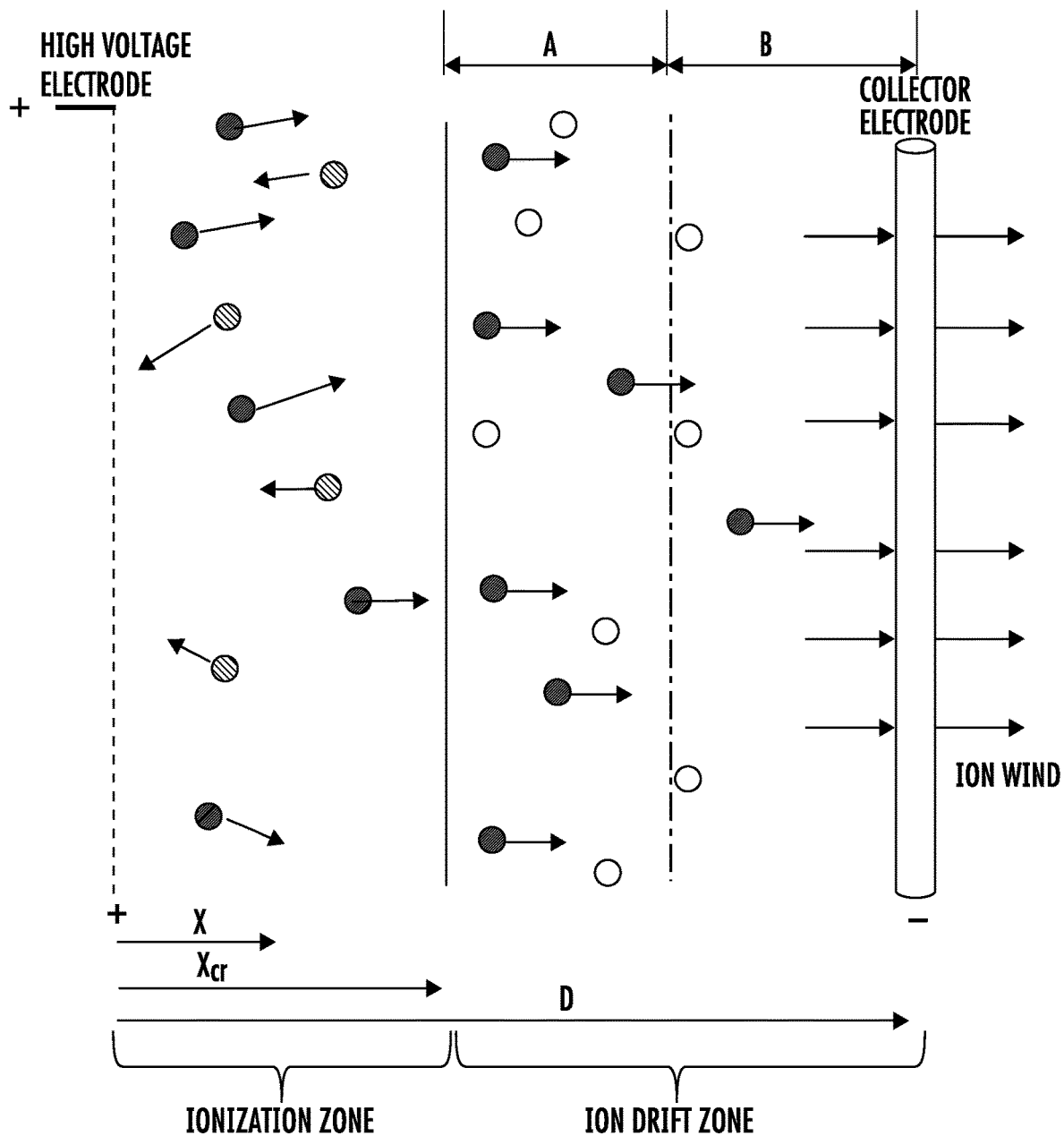
FIG. 4 is a diagram of an ion wind generator.
Figure 5:
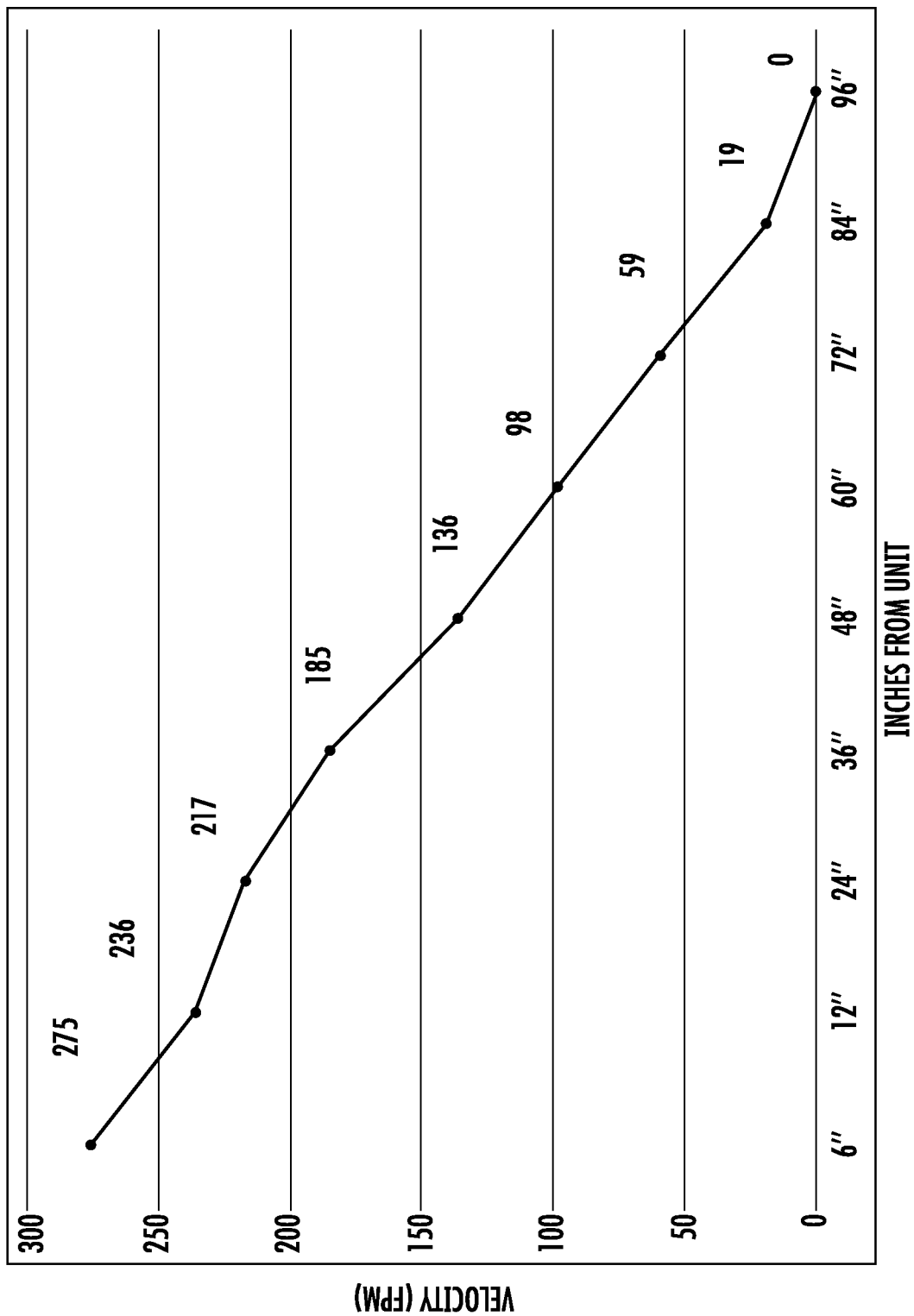
FIG. 5 is a chart plotting ion velocity relative to inches from an ion generator.
Figure 6:
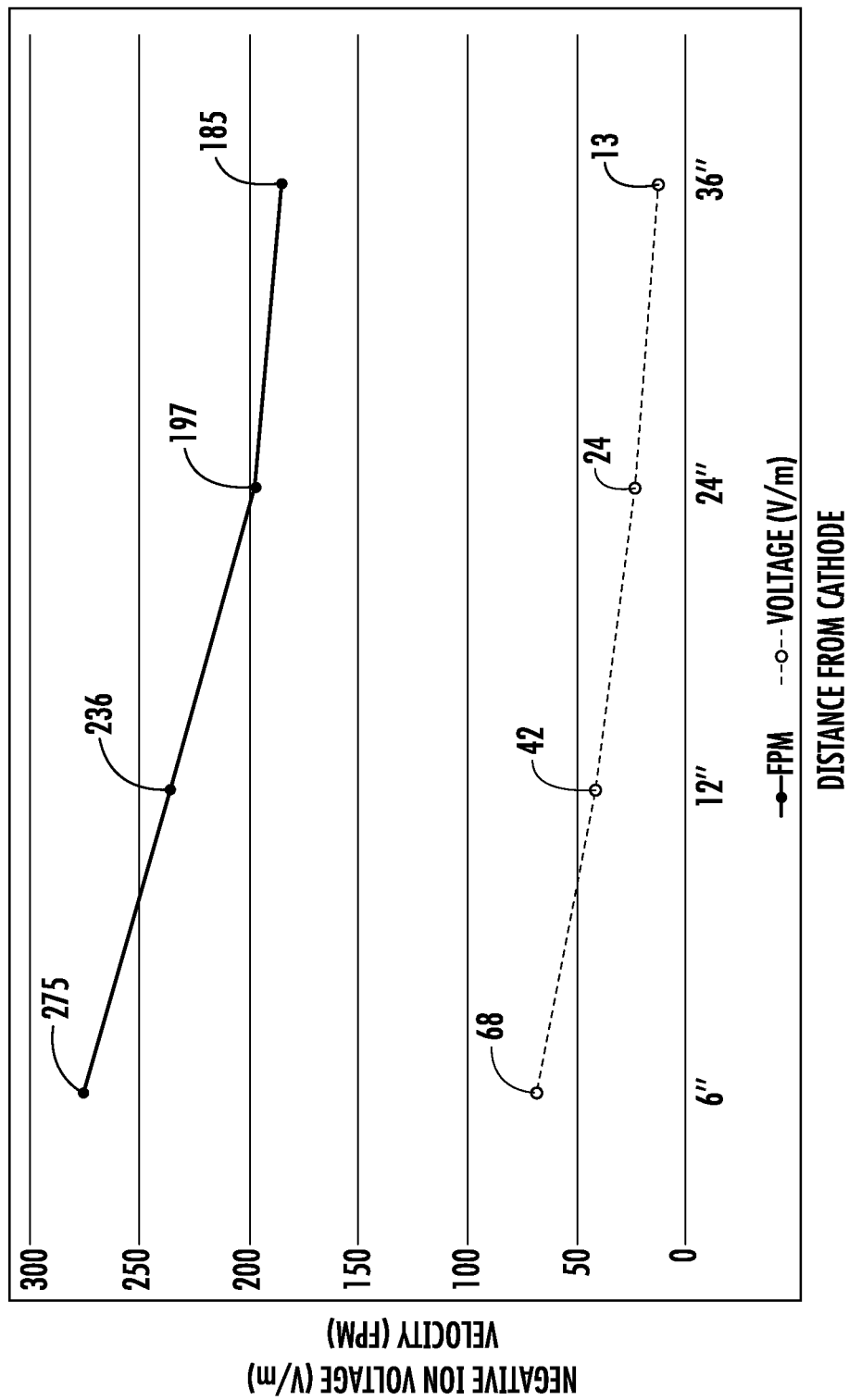
FIG. 6 is a chart plotting velocity and negative ion voltage relative to the distance from a cathode.

FIG. 4 is a diagram illustrating the flow of ions in an ion wind. This diagram illustrates the first ionization zone and a subsequent ion drift zone, followed by a collector electrode. The ion wind extends beyond the collector electrode. FIG. 5 is a chart plotting inches from the ion generator against ion velocity. It shows that the concentration of ions within the wind decreases the further away they get from the collector (or cathode). Finally, FIG. 6 plots the distance from the cathode against both ion velocity and voltage. In FIG. 6, the top plot shows ion velocity in feet per minute (FPM), while the lower plot shows voltage.

Principles of EHD Flows

EHD flow is the motion of electrically charged fluids under the influence of applied electric fields. EHD thrust is produced when ionized fluid is accelerated in an electric field due to the momentum transfer between the charged species and air molecules. The analytical model that couples space charge, electric field, and momentum transfer can be utilized to derive thrust forces. The EHD thrust expression derived from the first principles can be used to design a controlled negative ion field output generator. EHD thrusters at their heart are several devices in series each consisting of two electrodes separated by an air gap and connected to a high voltage source providing electric potential between the electrodes. When a sufficient potential is applied, the electrical breakdown of air occurs in which ions are generated near the high energy anode, known as the ionization region. The ions of the same polarity as the anode drift towards the cathode, accelerating the bulk flow by collision with the air molecules (in the drift region).

When a current passes between two electrodes—one thinner than the other—it creates a wind in the air between the electrodes. If enough voltage is applied, the resulting wind can produce a thrust without the use of a fan. This phenomenon is called electrohydrodynamic flow—or an "ionic wind." Net electric charges on conductors, including local charge distributions associated with dipoles, reside entirely on an external surface, and tend to concentrate more around sharp points and edges than on flat surfaces. This means that the charge emitted/generated by the electric field on a small diameter surface is much stronger than the field generated by the same charge residing on a large diameter surface, hence more emissions. When this electric field strength is strong enough, it ionizes the air about the surface, and a plasma is created on the conductive surface. Ionization of the nearby air molecules results in the generation of ionized air molecules having the same polarity as that of the charged surface. Subsequently, the small diameter surface repels the like-charged ion cloud (like charges repel), and the ion cloud immediately expands due to the repulsion between the ions themselves. This repulsion of ions creates an electric "wind" that emanates from the surface, which is usually accompanied by a hissing noise due to the change in air pressure at the surface.

The Mott-Gurney law describes the relation between maximum electric current density and applied voltage in semiconductors. It was derived by approximately solving the drift-diffusion equation coupled with Poisson's equation under space charge limited conditions.

The current density was shown to vary as $J \propto \varphi(\varphi - \varphi 0)$, in agreement with the Townsend ($\varphi$–I) relationship in 1914. It is an ionization process for gases where free electrons are accelerated by an electric field which collide with gas molecules, and consequently free additional electrons. Those electrons are in turn accelerated, collide with other gas molecules, and free additional electrons. The result is an avalanche multiplication that permits electrical conduction through the gas. The discharge requires a source of free electrons and a high voltage (strong electric field).

Since then, the form $I = C\varphi(\varphi - \varphi_o)$ has been widely adopted for corona discharge analysis, where I is the corona current, $\varphi$ is the corona voltage, $\varphi_o$ is the onset corona voltage and C is a fitting parameter. To physically interpret the parameter C, Cooperman showed that $C \propto \mu_b L_c^2$, where $\mu_b$ is the ion mobility and $L_c$ is the characteristic length scale. The thrust induced by the ions ($\varphi$–T) relationship can be derived based on Townsend's relationship ($\varphi$–I), and the maximum thrust can be defined based on Mott-Gurney law. The analytical expressions for ($\varphi$–I) and ($\varphi$–T) can be derived for steady-state conditions in planar coordinates. The continuity equation for the charge density is:

$$\frac{\partial \rho_e}{\partial t} + \nabla \cdot [(u + \mu_b E)\rho_e - D_e \nabla \rho_e] = 0, \qquad \text{Equation 1}$$

Where ρe is the charge density, u is the velocity vector of the bulk flow, E is the electric field, μb is the ion mobility, and De is the ion diffusivity.

De can be determined using the electrical mobility equation:

$$D_e = \frac{\mu_b k_B T_e}{q}, \qquad \text{Equation 2}$$

Where $k_B$ is the Boltzmann constant, Te is the absolute temperature, and q is the elementary charge. The electric field satisfies Maxwell's equation:

$$\nabla \cdot E = \frac{\rho_e}{\varepsilon}, \qquad \text{Equation 3}$$

The ion motion is assumed to be quasi-steady since the ion drift velocity is considerably higher than the EHD-induced bulk flow. The forcing on the ions by the electric field set up by potential between the electrodes is significantly greater than the space charge diffusion, so the space charge diffusion has not been typically considered. Guan et al. have shown that space charge density influences the electric field lines (and thus the ion drift direction) in the vicinity of the ionization region for geometries with high angles (>45°) between the bulk flow direction and the line connecting anode and cathode. In the geometry where the flow direction is aligned with electrode geometry, the space charge effect is significantly lower, and for the purpose of this derivation, is not considered. The electro-convective velocity due to external flow is negligible compared to the drift velocity. The continuity equation can be reduced to:

$$\nabla \cdot [\mu_b \rho_e E] = 0, \quad \text{Equation 4}$$

Where $\mu_b \rho_e E = J$ is the current flux.

Combining with Eq. (3), the ion transport equation can be written as:

$$\frac{\mu_b}{\varepsilon} \rho_e^2 - \mu_b \nabla \rho_e \nabla \varphi = 0. \quad \text{Equation 5}$$

Equation 5 can be Rearranged as:

$$\nabla \varphi = \frac{\rho_e^2}{\varepsilon \nabla \rho_e}. \quad \text{Equation 6}$$

In One Dimension (Aligned with the Flow Acceleration):

$$\frac{d\varphi}{dx} = \frac{\rho_e^2}{\varepsilon \frac{d\rho_e}{dx}}. \quad \text{Equation 7}$$

Taking the x-Derivative on Both Sides and Substituting into Maxwell's Equation:

$$\frac{d^2\varphi}{dx^2} = -\frac{\rho_e}{\varepsilon} = \frac{2\rho_e \frac{d\rho_e}{dx}\left(\varepsilon \frac{d\rho_e}{dx}\right) - \rho_e^2\left(\varepsilon \frac{d^2\rho_e}{dx^2}\right)}{\left(\varepsilon \frac{d\rho_e}{dx}\right)^2}. \quad \text{Equation 8}$$

Rearranging the Above Equation Results in:

$$3\left(\frac{d\rho_e}{dx}\right)^2 = \rho_e \left(\varepsilon \frac{d^2\rho_e}{dx^2}\right) \quad \text{Equation 9}$$

Thereafter Seeking the Solution in the Form:

$$\rho_e = Kx^n, \quad \text{Equation 10}$$

Next, substituting into Equation 9, the following expression is yielded:

$$3n^2 x^{2(n-1)} = n(n-1)x^{2n-2}. \quad \text{Equation 11}$$

From Equation 11 $n=-\frac{1}{2}$ and $\rho_e = Kx^{-\frac{1}{2}}$, substitute to $E = -d\varphi/dx$:

$$-\frac{d}{dx}\varphi = -\frac{\rho_e^2}{\left(\varepsilon \frac{d\rho_e}{dx}\right)} = \frac{2K}{\varepsilon}x^{1/2} \text{ AND } d\varphi = -\frac{2K}{\varepsilon}x^{1/2}dx. \quad \text{Equation 12}$$

Integrating on Both Sides Gives:

$$\varphi_c - \varphi = -\frac{4K}{3\varepsilon}x^{\frac{3}{2}}. \quad \text{Equation 13}$$

The Coefficient K can be Written as:

$$K = \frac{3\varepsilon}{4x^{\frac{3}{2}}}(\varphi - \varphi_c), \quad \text{Equation 14}$$

where $\varphi$ is the applied anode potential and $\varphi c$ is the constant potential in a corona discharge, which can be considered as potential at the x-location of the corona onset.

The Ion Current Flux Between the Anode and Cathode is:

$$J = \mu_b \rho_e E = \frac{9\mu_b \varepsilon(\varphi - \varphi_0)^2}{8x^3}. \quad \text{Equation 15}$$

The relationship in Equation 15 shows that $J \propto x^{-3}$ and has a similar form to Mott-Gurney law, $J = 9\mu_b \varepsilon \varphi 2/8d^3$, which describes the space charge saturation limit, where d is the distance between the electrodes and $\varphi$ is the applied potential. In corona discharge, the charged species are produced only after the onset potential is reached, so if $\varphi$ is replaced by $\varphi - \varphi_0$ and $x=d$, the current flux relation becomes takes the form of Mott-Gurney law.

The EHD flow in planar wire-to-cylinder geometry can be divided into three regions: i) ionization zone; ii) acceleration zone; and iii) momentum conservation region. To define the conditions in the acceleration region, consider $x_{cr}$, which is the characteristic length scale of the flow acceleration. For wire-to-cylinder geometry, the ionization and drift regions can be approximated as an infinite plane (in the y-direction) where $x_{cr}$ is the distance from the emitter to an examination position.

The current flux at the location $(x_{cr})$ can be written as:

$$J_{cr} = \mu_b \rho_e E = \frac{9\mu_b \varepsilon(\varphi - \varphi_0)^2}{8x_{cr}^3}, \quad \text{Equation 16}$$

$$I = \int J_{cr} dA = J_{cr} A, \quad \text{Equation 17}$$

where A is the cross-sectional area associated with ion interaction with the fluid at the location $x_{cr}$. For planar geometry (infinite length electrodes), the zone of ion interaction with the fluid can be normalized to a unit length (Lc×1). Substituting cross-section area into Equation 16 gives the current expression:

$$I = \frac{9\mu_b \varepsilon(\varphi - \varphi_0)^2}{8L_c x_{cr}}. \quad \text{Equation 18}$$

To simplify, we introduce a characteristic dimension (Lc) that defines the ion-flow interaction region, then Equation 18 can be reduced to:

$$I = \frac{9\mu_b \varepsilon(\varphi - \varphi_0)^2}{8L_c^2}. \quad \text{Equation 19}$$

This current-voltage relationship is like Townsend's quadratic relationship for the coaxial cylinder electrode configuration $I = C\varphi(\varphi - \varphi_0)$, where C is a fitting coefficient, typically obtained from the experiments, and it is dependent on the geometry. The physical interpretation of the parameter C is proposed by Cooperman for duct-type electrostatic precipitators as C∝μblLc2, where μb is the ion mobility and Lc is the characteristic length scale.

$$C = \frac{9\mu_b \varepsilon}{8L_C^2}.$$

Equation 20

The derived (φ–I) relationship Eq. (18) is more general than formulations given by Townsend, the values of φo and Lc must be determined for any specific geometry. Once the (φ–I) relationship is defined, force induced by EHD can be computed as the Coulomb force acting on the volume of fluid by the non-equilibrium concentration of ions between the anode and cathode.

$$F_{EHD} = \int f dV = \int \rho_e E dV = \int_0^d \rho_e E A_L dx = \frac{Id}{\mu_b} = \frac{9\varepsilon(\varphi - \varphi_0)^2 d}{8L_c^2},$$

Equation 21 where $F_{eHD}$ is the volumetric force induced by the ions and f is the force per unit volume.

Previous research shows the use of Townsend's current relation in Equation 21 to determine the EHD force by fitting the constant C. However, the measured thrust does not always agree with the calculated EHD force, because the measured thrust is the result of the coulombic and drag forces. Predicted thrust force from Townsend's current voltage relationship can be 70% greater than the measured one, likely due to losses associated with drag and the 3D field effects.

The determination of drag on the cathode in a wire-to-cylinder system requires the knowledge of the velocity profile. However, the velocity measurements can be challenging near the high voltage emitter and may not be available a priori.

The mean electric wind velocity v and pressure P can be approximated from the Bernoulli equation as:

$$P = \frac{1}{2}\rho v^2,$$

Equation 22 where ρ is the density of the fluid.

The pressure gradient in the one-dimension coordinate system induced by the corona discharge can be written as:

$$f = \frac{dP}{dx}$$

Equation 23

Combining Equation 21 and Equation 23, the Expression for Pressure can be Written as:

$$P = \int f dx = \frac{Id}{\mu_b A}.$$

Equation 24

The Mean Velocity of EHD Flow can be Determined from the Equation 22:

$$v = \sqrt{\frac{2Id}{\mu_b \rho A}}.$$

Equation 25

The Drag Force Due to the Flow Over the Cathode can be Calculated from the Following Expression:

$$F_D = \frac{1}{2}\rho v^2 S C_D,$$

Equation 26 where FD is the drag force, S is the cross-section area of the cathode and CD is the drag coefficient of the cathode.

Though in the case of corona discharge, the velocity profile is not uniform, Eq. (26) can be used as an approximation. Substituting Eq. (25) into Eq. (26) simplifies it further as follows:

$$F_D = \frac{Id}{\mu_b}\frac{SC_D}{A} = \theta F_{EHD}.$$

Equation 27

Here θ is a non-dimensionless quantity that is the ratio of the cross-section area of the cathode and corona discharge area multiplied by the drag coefficient of the cathode.

The value of θ has to be less than unity and must be determined for a specific cathode geometry. Thrust can be written as:

$$T = (1-\theta)F_{EHD}$$

Equation 28

This formulation can be used for determining the corona current and thrust forces in planar coordinates. Unlike the thrust force formulations that use Townsend relation with fitting parameter C, this model captures the thrust force generated by ions including aerodynamic losses.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system (20) for improved plant growth using an ion wind and an electromagnetic field, the system (20) comprising:
   an anode (22) coupled to a power supply (24), the power supply (24) having a sufficiently high voltage such that the anode (22) ionizes the surrounding air to generate ions (24);
   a cathode (26) positioned opposite the anode (22), an air gap (32) formed between the anode (22) and cathode (26), a portion of the ions (24) generated by the anode (22) being accelerated toward the cathode (26) to create the ion wind (28);
   a plant (34) positioned beneath the anode (22) and the cathode (26) and receiving the ion wind (28);
   an electromagnetic coil (36) positioned beneath the plant (34), the electromagnetic coil (36) generating an electromagnetic field (38) having a frequency of between 6-76 Hertz and a field strength of between 0.1 to 2.3 milliteslas;
   wherein the ion wind (28) and electromagnetic field (38) together facilitate beneficial growth within the plant (34).

2. A system for improved plant growth comprising:
an electrohydrodynamic flow generator for generating a downward flow of ions;
a plant positioned beneath the electrohydrodynamic flow generator for receiving the downward flow of ions;
a coil positioned beneath the plant for generating pulsed electromagnetic frequencies, the pulsed electromagnetic frequencies being received by the plant.

3. The system as described in claim 2 wherein a power source powers both the electrohydrodynamic flow generator and the coil.

4. The system as described in claim 2 wherein the coil generates an electromagnetic field having a frequency of between 1-76 Hertz.

5. The system as described in claim 2 wherein the coil generates an electromagnetic field having a strength of between 0.4 to 2.3 milliteslas.

6. The system as described in claim 2 wherein the coil generates an electromagnetic field having a frequency of approximately 40 Hertz.

7. The system as described in claim 2 wherein the electrohydrodynamic flow generator comprises:
an anode coupled to a power supply, the power supply having a sufficiently high voltage such that the anode ionizes the surrounding air to generate ions; and
a cathode positioned opposite the anode, with a portion of the ions generated by the anode being accelerated toward the cathode.

8. A system for improved plant growth comprising:
a grid forming an electrohydrodynamic flow generator, the electrohydrodynamic flow generator creating an ion flow;
a series of plants positioned beneath the grid for receiving the ion flow;
a series of coils, each coil positioned beneath an associated plant, each coil generating a pulsed electromagnetic frequency that is received by the associated plant;
a power supply powering the grid and the series of plants;
wherein the ion flow and pulsed electromagnetic frequency facilitate plant growth.

9. The system as described in claim 8 wherein each coil generates an electromagnetic field having a frequency of between about 1 to about 76 Hertz.

10. The system as described in claim 8 wherein each coil generates an electromagnetic field having a strength of between about 0.1 milliteslas to about to 2.3 milliteslas.

11. The system as described in claim 8 wherein each coil generates an electromagnetic field having a frequency of approximately 40 Hertz.

12. The system as described in claim 8 wherein the grid comprises:
an anode, the power supply having a sufficiently high voltage such that the anode ionizes the surrounding air to generate ions; and
a cathode positioned opposite the anode, with a portion of the ions generated by the anode being accelerated toward the cathode to create the ion wind.

13. The system as described in claim 8 wherein the plants are *cannabis* plants.

14. The system as described in claim 13 wherein the ion wind and pulsed electromagnetic frequency increases the output of Cannabinoids and Terpenes, including THC, in the *cannabis* plant.

15. The system as described in claim 8 wherein the plants are basil plants.

* * * * *